United States Patent Office 2,875,088
Patented Feb. 24, 1959

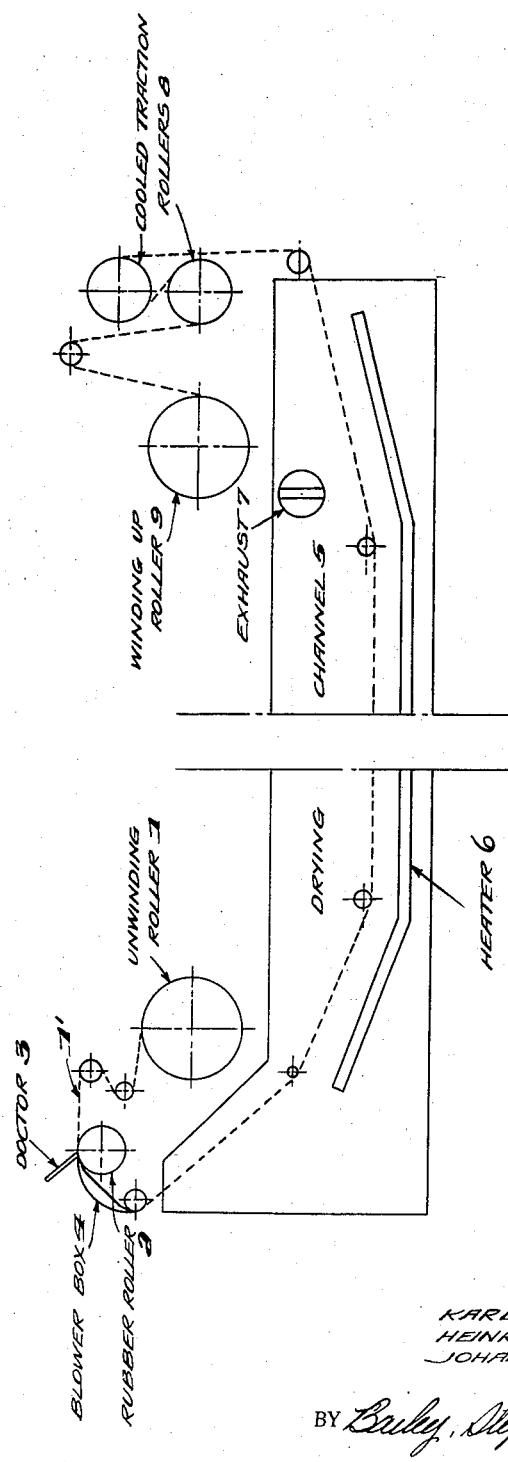

2,875,088
METHOD OF IMPROVING POROUS FILMS OF PLASTICIZED VINYL POLYMERS

Karl Stiehl, Hanau (Main), Heinrich Franz, Niederrodenbach, near Hanau (Main), and Johannes Valenteyn, Wolfgang, near Hanau (Main), Germany, assignors to Deutsche Gold- und Silber-Scheideanstalt vormals Roessler, Frankfurt am Main, Germany Application October 28, 1954, Serial No. 465,433

Claims priority, application Germany October 31, 1953

15 Claims. (Cl. 117—10)

The present invention relates to an improved process for treating porous plasticized vinyl polymer films or sheets either self sustaining or supported on woven fabrics or fiber fleeces and the like such as, for example, are employed as leather substitutes, and more particularly relates to a process whereby such porous films or sheets may be treated without destroying the porosity thereof.

Leatherlike materials have already been prepared by coating woven textiles or fiber fleeces with pastes of plasticized vinyl polymer compositions, gelling such pastes and stamping or embossing them. Similarly carrierless foils or films of leatherlike characteristics have been produced. However, such leatherlike products in comparison with natural leather have the disadvantage that they are not permeable to gases such as air or water vapor and are consequently rather unsuited for the production of clothing.

There already have been a number of proposals for the provision of micropores in such leatherlike materials to render them capable of "breathing," that is, render them permeable to gases such as air and water vapor but on the other hand substantially impervious to water in the form of drops. For example, it has been proposed to provide the desired porosity by perforating the leatherlike material by passing it through needle bearing rollers or by piercing such material with electric sparks in a high voltage field.

A further method which has been proposed to provide the desired porosity is to incorporate "blowing agents" in the pastes employed to produce the leatherlike materials. Such "blowing agents" are substances which decompose at elevated temperatures with the production of gas whereby fine pores are produced in the leatherlike products. The following compounds are suitable as blowing agents for plasticized vinyl polymer compositions in the production of leatherlike products: ammonium carbonate, ammonium bicarbonate, ethyl malonic acid, benzoic acid, o- and m-azoxy benzoic acid, diamino diphenyl amine, hydrazo benzene, citric acid and percompounds such as benzoyl peroxide and percarbamide. The quantity of such "blowing agents" employed can, for example, be between about 0.2 to 5% of the weight of the pastes from which the leatherlike products are produced and they are incorporated in such pastes either in finely divided form or as aqueous solutions. The drying and gelling temperature employed in the production of the leatherlike products is adjusted to correspond to the decomposition temperature of the blowing agent employed.

It has also been proposed to incorporate liquids in the pastes from which the leatherlike products are produced which have appropriate boiling points so as to evaporate during the gelling of the pastes to achieve the desired pores.

A further method is to mix water soluble substances or substances which can be rendered water soluble with the plasticized vinyl polymer pastes and dissolving out the water soluble components after the gelling procedure to produce the desired porosity.

Finally another process of producing vinyl polymer leatherlike products capable of "breathing" is to incorporate substances which are swollen with water or organic solvents in the pastes employed to produce the leatherlike products so as to provide pores in the leatherlike products produced upon shrinkage of the swollen substances. Examples of swellable substances which can be employed for this purpose are starch, viscose, casein, gelatine, agar agar, polyvinyl alcohol polyamides, cellulose ethers and cellulose esters. A special advantage of this method is that the leatherlike products can be grained by stamping or embossing without substantial loss in the porosity of the products produced.

All of the porous leatherlike products capable of breathing which are produced from plasticized vinyl polymers such as plasticized polyvinyl chloride by the methods described above, however, have the unpleasant characteristic of all ordinary polyvinyl artificial leathers that they possess a somewhat sticky and damp surface which is easily soiled caused by migration of the plasticizers to the surface. On the other hand, when it was attempted to correct this difficulty in the normal manner by application of a lacquer coating to prevent plasticizer migration to the surface, the lacquer clogged the fine pores which provide the "breathing" characteristics of the leatherlike products.

It is therefore an object of the present invention to provide a method of improving the surface characteristics of porous plasticized polyvinyl leatherlike products without deleteriously affecting their "breathing" characteristics.

In accordance with the invention, it was unexpectedly found that porous leatherlike products could be coated with a lacquer capable of producing a dry hand and soil repeling surface without closing the pores of such products, or otherwise deleteriously affecting their "breathing" characteristics, by spreading or spraying on such a lacquer coating and causing a gas to issue from the pores of the leatherlike products being coated against the back face of the coating to render such coating porous.

Preferably this object is attained by passing a weak gaseous stream through the pores of the leatherlike product from the side opposite that being coated while it is being coated with the desired lacquer and continuing blowing such stream through the pores of the leatherlike product until the coating has set sufficiently to prevent reclosing of the pores. Advantageously the gaseous stream is blown through the pores at an elevated temperature to effect a more rapid drying and setting of the lacquer coating.

In order to blow a gaseous stream through the porous leatherlike product it may be passed over a perforated hollow roller which either can be stationary or rotatable or a slightly arched perforated hollow body, the interior of which is supplied with a stream of gas such as air from a suitable pump. It is important when the lacquer is applied by a doctor that such doctor is situated immediately ahead of the perforated roller or arched hollow body in order that air pressure is supplied to the underside of the leatherlike product being coated as close as possible after the spreading edge of the doctor. In the event that the lacquer coating is sprayed on, care must be taken that the lacquer is sprayed on only in the zone of the artificial leather directly over the perforated roller or arched hollow body. After the lacquer coating has been applied in the manner described it is passed through a drying zone at temperatures between 60° and 90° C. during which, if desirable, a gaseous stream may still be passed through the pores from the side opposite to the coating. Thereafter, if desired, the leatherlike product can be gelled and embossed to provide a better bond between the lacquer coating and the leatherlike base. Even a better bond can be achieved between the polyvinyl leatherlike base and the lacquer coating if the porous polyvinyl base has only been pregelled at 90° to 120° C. before application of the lacquer coating in the manner described and the coated product then dried, then gelled at 160–180° C. and immediately thereafter embossed.

Preferably a gas stream is also passed through the pores of the coated leatherlike product during the gelling and embossing operations to avoid closing of the pores under the influence of high heat during the gelling operation and of the pressure during the embossing operation. A particularly advantageous manner of providing the desired passage of a gas through the pores of the coated leatherlike product during the embossing operation is to support the leatherlike product upon a foam rubber sheet or similar elastic foam material which in turn is supported upon a gas impervious base so that the pressure exerted by the raised portions of the embossing rolls compress the corresponding portions of the foam rubber support which in turn causes a light stream of gas to pass through the pores of the leatherlike product thereover which suffices to prevent closure of the pores.

In accordance with another modification of the invention the desired porosity of the applied lacquer coating or porous polyvinyl leatherlike products is achieved by impregnating the porous leatherlike products with a liquid or mixture of liquids which is inert with respect to the leatherlike material, that is, will not dissolve or swell the polyvinyl base, so as to fill the pores of the leatherlike product before application of the lacquer coating and then, before such coating has set, heating the coated product to cause vaporization of the liquid so that the gaseous vapors thereof issue from the pores of the leatherlike material against the backface of the coating and render it porous. The impregnating liquids can be low-, medium- or high-boiling point liquids or water or mixtures thereof. Advantageously, such liquid can have dissolved therein a "blowing" agent such as ammonium carbonate, ammonium oxalate or urea oxalate.

Preferably the impregnating liquid is made up of a mixture of lower and higher boiling liquids. And the porous polyvinyl leatherlike product is one that has only been pregelled at about 90 to 120° C. for about 15 to 30 minutes. After such a porous pregelled leatherlike material is impregnated with the mixture of liquids, it is coated with a suitable lacquer and dried sharply, for example, at about 90° C., in order to vaporize at least a portion of the lower boiling component of the impregnating liquid and a portion of the solvent contained in the lacquer sufficient to render the lacquer coating substantially untacky but insufficient fully to set such lacquer and then subjecting the predried coated leatherlike material to gelling at temperatures between 160 and 180° C. during which the remaining impregnating liquids and any blowing agent present vaporize to maintain the desired porosity of the coated leatherlike material. If desired, the leatherlike product can then be embossed to give a grain effect immediately following the gelling operation. The small residues of the impregnating liquid still contained in the pores tend to prevent loss of porosity during the embossing operation.

When the impregnating liquid employed is composed only of low boiling constituents, it is preferable that the porous leatherlike material impregnated therewith has already been fully gelled so as to avoid possible loss of porosity in the coated product by flow engendered during the necessarily high temperatures of a gelling treatment.

Lacquers which contain polyacrylic acid esters or polymethacrylic acid esters, especially the methyl esters, or low molecular weight polyesters and diisocyanates such as, for example, a polyester containing free hydroxyl groups produced from adipic acid and butylene glycol having a molecular weight of 1000–2000 and toluylene diisocyanate as film formers have been found admirably suited according to the invention to provide the desired soil resisting coatings of dry hand upon the porous leatherlike materials. The lacquer also can contain pigments to provide shading or graining effects upon the leatherlike material coated.

The accompanying drawing diagrammatically shows an apparatus suitable for carrying out the process according to the invention.

In such drawing, 1 represents the roller from which the porous plasticized polyvinyl polymer 1' which is to be coated is unwound, and passed to rubber roller 2 and doctor 3 where the soil resisting coating is applied. A blower box 4 is provided immediately behind roller 2 and doctor 3 to blow air through the sheet to render the applied coating porous. Thereafter the sheet is passed through drying channel 5 which is provided with a heater 6 and exhaust 7 with the aid of cooled traction rollers 8 and wound up on roller 9.

The following examples will serve to illustrate several modifications of the present invention.

*Example 1*

A porous plasticized polyvinyl chloride artificial leather capable of breathing which had not yet been embossed was drawn over a slightly arched surface of a highly polished perforated hollow body while air was blown through the pores in such artificial leather by pumping air into the perforated hollow body, and the surface of the artificial leather through which the air was being blown was spray coated with a lacquer of the following composition:

14.0% high viscosity polymethylmethacrylate (plexigum M334)
4.0% low viscosity polymethylmethacrylate (Plexigum M265)
5.0% finely divided silica aerogel (produced by vapor phase hydrolysis of silicon halides at high temperatures)
4.0% dioctylphthalate
3.0% cyclohexanone
10.0% methylglycolacetate
20.0% butyl acetate
30.0% butanone
10.0% ethyl acetate The current of the air which was passed through the pores of the artificial leather being coated was maintained at 60° C., the length of the perforated hollow body was such that the sprayed on coating was substantially dry before passing beyond the zone in which the air was being passed through the pores of the artificial leather. The thus coated artificial leather was then gelled at 160 to 180° C. and embossed to produce a grained effect while supported on a foam rubber sheet which in turn was supported on a gas impervious support so that the compression of the foam rubber engendered by the embossing operation forced air through the coated product while it was being embossed to prevent closure of the pores. The resulting coated product was of excellent porosity and had a good soil resisting surface of dry hand.

*Example 2*

A porous plasticized polyvinyl chloride artificial leather capable of breathing which had not yet been embossed was drawn over a slightly arched highly polished perforated surface of a hollow body while air was blown through the pores in such artificial leather by pumping air into the hollow body and a lacquer coating was spread thereon with a doctor knife immediately ahead of the zone in which the artificial leather passed over the perforated surface so that the air was blown through the pores of the artificial leather immediately after the coating was applied. The lacquer coating applied was of the following composition:

13.0% high viscosity polymethylmethacrylate (Plexigum M334)
5.0% low viscosity polymethylmethacrylate (Plexigum M265)
4.0% finely divided silica aerogel (produced by vapor phase hydrolysis of silicon halides at high temperatures)
3.0% dioctylphthalate
5.0% cyclohexanone
7.5% methylglycolacetate
22.5% butyl acetate
30.0% butanone
10.0% ethyl acetate As in Example 1 the current of air which was passed through the pores of the artificial leather was heated to 60° C. to dry the lacquer coating and the dried coated artificial leather was gelled and embossed as in Example 1.

A second lacquer coating was then applied to the coated porous product under the same conditions as the coating so that air was passed through the pores of the coated porous product immediately after application of the second coating until the coating was dried so that the pores remained open. The second lacquer coating was of a shading lacquer of the following composition:

9.0% high viscosity polymethylmethacrylate (Plexigum M334)
2.8% mixed polymer of vinyl chloride and vinyl acetate
2.8% plasticizer (dibutyl phthalate+dioctyl phthalate in the ratio of 1:1)
3.5% pigment
0.1% stabilizer VH (monophenyl urea)
0.2% lead stearate
11.6% acetone
10.0% methyl glycol acetate
15.0% butanone
5.0% tetrahydrofurane
20.0% toluene
20.0% ethyl acetate

*Example 3*

A porous plasticized polyvinyl chloride artificial leather capable of breathing which had not yet been embossed was drawn over a slightly arched highly polished perforated surface of a hollow body while air was blown through the pores in such artificial leather by pumping air into the hollow body and a lacquer coating was spread thereon with a doctor knife immediately ahead of the zone in which the artificial leather passed over the perforated surface so that the air was blown through the pores of the artificial leather immediately after the coating was applied. The lacquer coating applied was of the following composition:

33.0% of a polyester of a molecular weight of 1200 containing free hydroxyl groups produced from adipic acid and butylene glycol ("Desmophen")
47.0% of butyl acetate
20.0% of toluylene diisocyanate ("Desmodur")

This lacquer was prepared by first mixing the polyester with the butyl acetate and mixing in the toluylene diisocyanate only just before the lacquer was spread as the latter reacts very rapidly with the polyester to produce a gel-like paste which is difficult to spread.

As in Example 1 the current of air which was passed through the pores of the artificial leather was heated to 60° C. to dry the lacquer coating and the dried coated artificial leather was gelled and embossed as in Example 1.

*Example 4*

A porous plasticized polyvinyl chloride artificial leather which had been pregelled at a temperature of about 110° C. for about 20 minutes was impregnated by passing it through the following solution:

29.0% water
29.0% ethyl alcohol
42.0 methyl alcohol

Immediately after the impregnation the surface of the artificial leather was coated with a lacquer of the same composition as that employed in Example 1 then dried for about 5 minutes at 90° C. and thereafter gelled at 160° to 180° C. and then immediately embossed. The vaporization of the impregnating liquid retained in the pores of the coated artificial leather during the drying and subsequent operations prevented the pores of the artificial leather base from becoming clogged with the lacquer and also rendered the lacquer porous.

*Example 5*

A porous polyvinyl chloride artificial leather which had been pregelled at a temperature of about 110° C. for 20 minutes was impregnated with a solution of the following composition:

28.0% water
28.0% ethyl alcohol
5.0% ammonium carbonate
20.0% methyl glycol
19.0% ethyl glycol Immediately after the impregnation the surface of the artificial leather was coated with a lacquer of the following composition:

10.0% polyvinyl chloride
8.0% high viscosity polymethylmethacrylate (Plexigum M334)
4.0% dinonyl phthalate
2.0% dioctyl adipate
5.0% silica aerogel
1.0% aluminum palmitate
10.0% cyclohexanone
5.0% methyl glycol acetate
30.0% butanone
25.0% tetrahydrofurane The coated artificial leather was then dried at 90° C. for about 5 minutes and then gelled at 160 to 170° C. The vaporization of the impregnating liquid during the drying and gelling treatments and the gases evolved by the decomposition of the ammonium carbonate during the gelling treatment maintained a good porosity in the coated artificial leather product.

We claim:

1. A process for improving the surface characteristics of sheets of porous plasticized polyvinyl polymer without impairing the porosity thereof which comprises applying a soil repelling lacquer coating to such sheets and causing a gaseous stream to issue from the pores of the sheets against the back side of such coating before it has set to render such coating porous.

2. A process according to claim 1 in which said polyvinyl polymer is polyvinyl chloride.

3. A process according to claim 1 comprising in addition, embossing the lacquer coated product while causing a gaseous stream to issue from the pores of the sheets against the back side of the coating.

4. A process according to claim 1 in which the coating lacquer contains a polyacrylate ester as a film former.

5. A process according to claim 1 in which the coating lacquer contains a polymethacrylate ester as a film former.

6. A process according to claim 1 in which the coating lacquer contains a polymethylacrylate ester as a film former.

7. A process according to claim 1 in which the coating lacquer contains a polymethylmethacrylate ester as a film former.

8. A process according to claim 1 in which the coating lacquer contains a low molecular weight polyester and a diisocyanate as film formers.

9. A process for improving the surface characteristics of sheets of porous plasticized polyvinyl polymer without impairing the porosity thereof which comprises applying a soil-repelling lacquer coating to such sheets and blowing a gaseous stream through the pores of the sheets against the back side of such coating before it has set to render such coating porous.

10. A process according to claim 9 in which the gaseous stream passed through the pores has been heated to 40 to 90° C.

11. A process according to claim 9 comprising in addition heating the coated sheets to a gelling temperature between 160–180° C. and embossing said coated sheets while blowing a gaseous stream through the pores of the sheets and the coating thereover during such gelling and embossing operations to maintain the porosity of the coated product during such operations.

12. A process for improving the surface characteristics of sheets of porous plasticized polyvinyl polymer without impairing the porosity thereof which comprises applying a soil-repelling lacquer coating to such sheets and passing said coated sheets over and in contact with a perforated surface while blowing a gaseous stream through the perforations in such surface and the pores of the sheets passing thereover against the back side of such coating before it has set to render such coating porous.

13. A process for improving the surface characteristics of sheets of porous plasticized polyvinyl polymer without impairing the porosity thereof which comprises impregnating such porous polymer with a vaporizable liquid inert with respect to such sheets to fill the pores of the polymer with such liquid, applying a soil repelling lacquer coating to such impregnated sheets and subsequently heating such coated sheets to evaporate the impregnating liquid and cause the resulting vapors to issue from the pores of the sheets against the back side of the coating before it has set to render such coating porous.

14. A process according to claim 13 in which the impregnating liquid contains a blowing agent and the coated sheets are heated to a temperature at which the impregnating liquid evaporates and the blowing agent decomposes with liberation of a gas.

15. In a process for embossing sheets of porous plasticized polyvinyl polymer to provide a grained surface effect the step which comprises supporting such porous sheets upon a sheet of foamed elastic material which is in turn supported upon a gas impermeable base during the embossing operation so that upon compression of the foamed elastic material during the embossing operation the gas displaced from the foamed elastic material is forced through the pores of the sheet material to maintain the porosity of the embossed plastic.

References Cited in the file of this patent

UNITED STATES PATENTS

| | | |
|---|---|---|
| 1,604,941 | Hofmann | Oct. 26, 1926 |
| 1,918,937 | Shelton | July 18, 1933 |
| 2,291,616 | Fletcher | Aug. 4, 1942 |
| 2,414,177 | Smith | Jan. 14, 1947 |
| 2,576,073 | Kropa et al. | Nov. 20, 1951 |
| 2,605,855 | Lenz | Aug. 5, 1952 |
| 2,672,863 | Leight | Mar. 23, 1954 |